Patented Apr. 21, 1936

2,037,932

UNITED STATES PATENT OFFICE 2,037,932

RUBBER COMPOSITION AND METHOD OF PRESERVING RUBBER

Waldo L. Semon, Silver Lake Village, Ohio, assignor to The B. F. Goodrich Company, New York, N. Y., a corporation of New York No Drawing. Application May 11, 1934, Serial No. 725,075. In France May 29, 1933

20 Claims. (Cl. 18—50)

This invention relates particularly to the art of rubber manufacture and especially to preservation of rubber or rubber goods against deterioration, but includes also the preservation of other oxidizable organic materials such as fatty oils, petroleum oils and their derivatives, soaps, etc.

It is well known that many organic substances undergo a more or less rapid deterioration which is commonly ascribed to the action of atmospheric oxygen. It has heretofore been proposed to retard or inhibit this deterioration by adding a small proportion of a phenol, an aromatic base, or some other like substance, termed generally an "anti-oxidant".

I have discovered a new class of anti-oxidants or age-resisters which are extraordinarily effective in retarding the deterioration of rubber and like organic materials. This new class of substances includes generally compounds analogous to secondary aromatic amines in that they contain a single amino nitrogen atom attached to nuclear carbon atoms of two carbon rings, but in which the two rings are also joined by a carbon bridge ortho to the nitrogen. These compounds are therefore condensed ring heterocyclic bases, conforming to the general structural formula

where R and R₁ are homocyclic or carbon rings and X is a saturated carbon bridge. In the simplest case, in which each R is a benzene ring and X is an unsubstituted methylene group, the compound is acridane, which has the structural formula

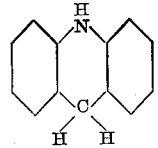

However, acridane is at present not regarded as practically useful because of its great instability, and particularly the ease with which it is oxidized by atmospheric oxygen to acridine, which is not a useful anti-oxidant. It is therefore preferred to use homologous or analogous compounds and preferably those in which one or both hydrogens on the methylene carbon bridge (the so-called meso position) are replaced by hydrocarbon groups, or in which the single carbon bridge is replaced by a chain of two or more carbon atoms. For reasons which are not well understood these changes in chemical structure so increase the stability of the compounds that they can be prepared and used without difficulty.

It will be noted that the compounds of this invention are substituted hydro-acridines, or analogues thereof, and each contain a single secondary amino nitrogen. The presence of substituents on one or more of the carbon atoms, and particularly on the meso carbon, tends to prevent the compounds of this invention from absorbing oxygen and changing to acridine compounds, in which the nitrogen is tertiary instead of secondary, and which are of little or no value as anti-oxidants. In the preferred compounds, containing two substituents on the meso carbon, such a change to acridine compounds is impossible under ordinary conditions. The term "acridine" is accordingly employed herein in contra-distinction to acridine to designate a compound or class of compounds containing two carbon rings joined by a single amino nitrogen bridge and a single carbon bridge ortho to the nitrogen, and containing a replaceable hydrogen atom on the nitrogen, and therefore exhibiting many of the properties characteristic of secondary aromatic amines. The term "acridane" is employed in a generic sense as well as a specific, the generic sense being intended in the claims whenever the term is accompanied by an indefinite article except where the term is otherwise limited.

The two carbon rings may both be aromatic rings such as benzene or naphthalene rings or even other rings of more complex structure, or saturated rings such as cyclohexane rings, or one ring may be aromatic and one saturated. Furthermore, one or both of the rings may be only partially saturated, as in dihydro or tetrahydro benzene, tetrahydronaphthalene and the like. It is essential that the amino nitrogen be secondary and not tertiary in nature, that is, that it contain a replaceable hydrogen atom, for only the secondary bases exhibit the high anti-oxidant activity characteristic of the compounds of this invention. The compounds may also contain other substantially neutral or basic groups such as hydrocarbon groups, oxy groups or amino groups (including hydroxy, alkoxy, aryloxy and thioether groups and primary amino as well as secondary and tertiary, alkyl and aryl substituted, amino groups) substituted on the carbon rings. Acidic groups, on the other hand, tend to destroy the basic character of the compound and diminish or destroy their anti-oxidant activity. Completely neutral substituents such as hydrocarbon groups and ether groups (including both alkoxy and aryloxy groups) are generally preferred.

The compounds employed as anti-oxidants in this invention may be any one or more of the homologues or analogues of acridane having hydrocarbon groups such as methyl, ethyl, propyl, butyl, amyl, isobutenyl, benzyl, phenyl, tolyl, cumyl, naphthyl and the like substituted on any of the carbon atoms, or having naphthalene or other condensed ring nuclei or fully or partially saturated rings substituted for the benzene rings. They may also include other substituents of the character described above substituted on either or both of the rings. This new class of anti-oxidants accordingly includes such typical compounds as:

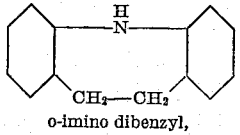
o-imino dibenzyl,

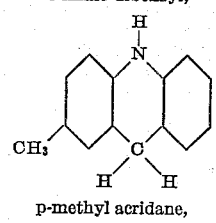
p-methyl acridane, as well as the corresponding hexahydro and dodecahydro compounds,

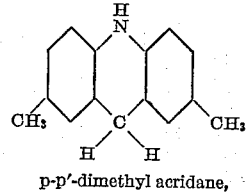
p-p'-dimethyl acridane, as well as the corresponding dihydro and octahydro compounds,

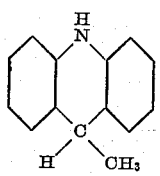
meso-methyl acridane, as well as similar meso-ethyl, propyl, butyl, heptadecyl, phenyl, tolyl, etc. acridanes,

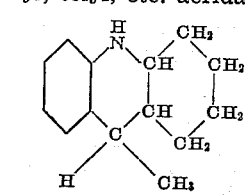
meso-methyl hexahydro acridane,

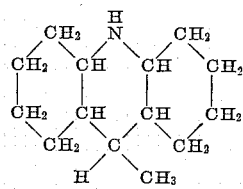
meso-methyl dodecahydro acridane,

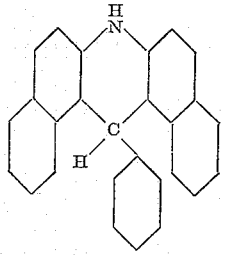
meso-phenyl dinaphthacridane,

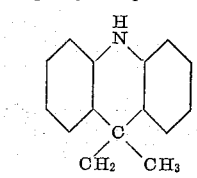
meso, meso dimethyl acridane, as well as similar meso meso diethyl, dipropyl, dibutyl, di-dodecyl, di-heptadecyl, dibenzyl, diphenyl, ditolyl, dicumyl, dinaphthyl, meso-methyl meso-ethyl, meso-methyl meso-butyl, meso-methyl meso-phenyl, meso-ethyl meso-phenyl, etc. acridanes,

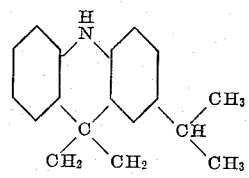
p-isopropyl meso, meso dimethyl acridane,

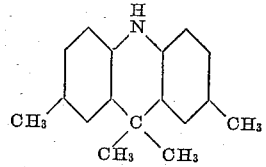
p, p', meso, meso tetramethyl acridane, as well as similar p-isopropyl, p-methoxy, etc. substituted acridanes,

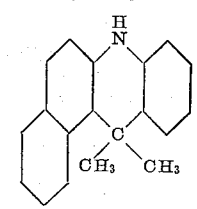
meso, meso dimethyl naphthacridane,

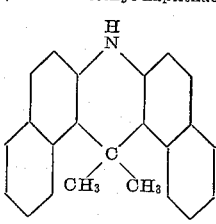
meso, meso dimethyl dinaphthacridane,

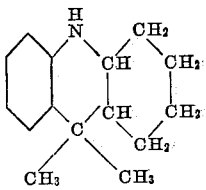

meso, meso dimethyl hexahydro acridane,

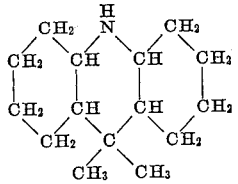

meso, meso dimethyl dodecahydro acridane,

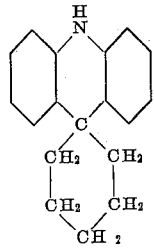

meso, meso pentamethylene acridane, etc.

The preferred compounds are the simple acridanes of low molecular weight having two alkyl groups on the meso carbon atom, and similar partly saturated compounds.

Any member of the class of compounds set forth above, and specifically any one of the compounds herein enumerated may be employed with good effect to retard the deterioration of an oxidizable organic substance such as rubber, cracked gasoline, unsaturated fatty oils, soaps, lubricants, essential oils and the like, by incorporating a small proportion therewith.

The compounds of this invention may be prepared by various reactions familiar to organic chemists. A convenient method for preparing the meso disubstituted acridanes is as follows, the method being illustrated with reference to the specific product meso, meso dimethyl acridane. The methyl ester of N-phenyl anthranilic acid (methyl ester of the o-carboxylic of diphenylamine) is prepared by any usual or convenient method. An ether solution of methyl magnesium iodide is then prepared in the usual way by dissolving 50 parts by weight of magnesium in a solution of 284 parts of methyl iodide in dry ether. 227 parts of the methyl ester of N-phenyl anthranilic acid are dissolved in dry ether and slowly added to the other solution, whereupon considerable volumes of gas are evolved and the solution turns yellow. The solution is evaporated to dryness and finally heated to 100° C. and is then decomposed by adding a dilute aqueous solution of ammonium chloride. The aqueous solution is extracted with ether and the extract is washed with dilute hydrochloric acid and dried. The residue so obtained is o-phenylamino phenyl dimethyl carbinol and is formed by the conversion of the ester used as a starting material into the corresponding tertiary alcohol by a conventional Grignard reaction. The said alcohol (o-phenylamino phenyl dimethyl carbinol) is then dehydrated by treating it with sulphuric acid, or preferably by simply heating it to eliminate water, the vapors of the product formed being fractionally condensed. The reaction is as follows:

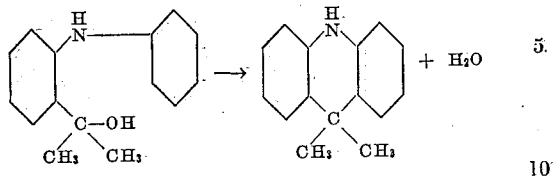

The bulk of the product consists of colorless crystals of meso, meso dimethyl acridane melting when pure at about 127° C. Many other compounds within the scope of this invention may be prepared in a similar manner by substituting other analogous raw materials for those specified above. The partially or wholly saturated compounds are readily prepared by catalytic hydrogenation of the corresponding acridines or acridanes, using a nickel or copper chromite catalyst with hydrogen under a pressure of about 100 atmospheres and a temperature of about 200° C.

As an illustration of one manner of employing the anti-oxidants, a typical tire tread composition is prepared containing 100 parts by weight of rubber, 5.5 parts of sulphur, 30 parts of zinc oxide, 40 parts of gas black, 10 parts of mineral rubber, 5 parts of palm oil, 0.75 parts of hexamethylene tetramine, and 0.95 parts (0.5% of the weight of the composition) of meso, meso dimethyl acridane. This composition is vulcanized in a mold for 45 minutes at 294° F. to produce an optimum cure. It is found to deteriorate only from one-fourth to one-third as rapidly as the same composition without anti-oxidant, when submitted to the usual accelerated aging tests such as the Geer oven test and the Bierer-Davis bomb test, and furthermore greatly reduces the tendency of the rubber to develop fatigue cracks upon rapidly repeated flexing. Even better results are obtained with a partially saturated compound such as meso, meso dimethyl hexahydroacridane.

Any of the anti-oxidants within the scope of this invention may be similarly employed in any type of rubber composition, such as those used for automobile tires and tubes, hose, belting, sheet and thread rubber, rubberized fabrics, molded goods, seamless dipped goods, boots and shoes, etc., whether vulcanized in a mold, in open steam, in hot air, or even vulcanized in the cold by the so-called acid process. The proportion of anti-oxidant may vary from about 0.1% to 5%, although either smaller or greater proportions may be found useful, and it may be added to the rubber or other substance at any desired state of the preparation of the product. If the material to which it is added is a liquid such as a rubber cement or an oil the anti-oxidant may simply be dissolved therein in a suitable small proportion, say 0.2% by weight. It is accordingly to be understood that the term "treating" is employed in the appended claims in a generic sense to embrace the incorporation of the anti-oxidant into a solid substance by milling or mastication, its addition to an aqueous dispersion such as rubber latex in a finely dispersed form, its solution in liquids, and any equivalent methods such as applying it to the surface of vulcanized or unvulcanized rubber in the form of a powder, paste, or solution.

The term "rubber" unless otherwise limited is likewise employed in a generic sense to include caoutchouc, balata, gutta-percha, reclaimed rubber, synthetic rubber, artificial rubber isomers, and like products, whether vulcanized or unvulcanized and whether or not admixed with fillers, pigments, vulcanizing and accelerating agents.

While I have herein disclosed with considerable particularity certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

This application is a continuation in part of my forfeited application Serial No. 617,609 filed June 16, 1932.

I claim:

1. The method of retarding the deterioration of rubber which comprises treating the rubber with at least 0.2% of a compound having the general structural formula

where R and R₁ represent carbon rings which may contain hydrocarbon and alkoxy substituents but no others, and X represents a carbon bridge ortho to the nitrogen.

2. The method of retarding the deterioration of rubber which comprises treating the rubber with an acridane consisting solely of carbon, hydrogen and a single nitrogen atom, and in which at least one carbon ring is at least partially saturated.

3. The method of retarding the deterioration of rubber which comprises treating rubber with at least 0.2% of a compound having the general structural formula

where R and R₁ represent carbon rings which may contain hydrocarbon and alkoxy substituents but no others, and X represents a carbon bridge ortho to the nitrogen and containing either in the bridge itself or in a side chain more than one carbon atom.

4. The method of retarding the deterioration of rubber which comprises treating rubber with at least 0.2% of an acridane consisting solely of carbon, hydrogen and a single nitrogen atom, and containing at least one hydrocarbon group substituted on the meso carbon.

5. The method of retarding the deterioration of rubber which comprises treating rubber with at least 0.2% of an acridane consisting solely of carbon, hydrogen and a single nitrogen atom, and containing two hydrocarbon groups substituted on the meso carbon.

6. The method of retarding the deterioration of rubber which comprises treating rubber with at least 0.2% of meso, meso dimethyl acridane.

7. The method of retarding the deterioration of rubber which comprises treating rubber with a compound having the general structural formula

where R and R₁ represent carbon rings which may contain hydrocarbon and alkoxy substituents but no others and at least one ring R is at least partially saturated and X represents a carbon bridge ortho to the nitrogen.

8. The method of retarding the deterioration of rubber which comprises treating rubber with an acridane consisting solely of carbon, hydrogen and a single nitrogen atom, in which at least one of the carbon rings is at least partially saturated, and which contains at least one hydrocarbon group substituted on the meso carbon.

9. The method of retarding the deterioration of rubber which comprises treating rubber with an acridane consisting solely of carbon, hydrogen and a single nitrogen atom, in which at least one of the carbon rings is at least partially saturated, and which contains two hydrocarbon groups substituted on the meso carbon.

10. The method of retarding the deterioration of rubber which comprises treating rubber with meso, meso dimethyl hexahydro acridane.

11. A rubber composition comprising rubber and at least 0.2% of a small proportion of a compound having the general structural formula

wherein R and R₁ represent unsubstituted carbon rings and X represents a carbon bridge ortho to the nitrogen.

12. A rubber composition comprising rubber and at least 0.2% of a small proportion of an acridane consisting solely of carbon, hydrogen and a single nitrogen atom, and containing at least one hydrocarbon group substituted on the meso carbon.

13. A rubber composition comprising rubber and at least 0.2% of an acridane which may contain hydrocarbon and alkoxy substituents on the carbon atoms, but which contains no other substituents.

14. A rubber composition comprising rubber and at least 0.2% of an acridane consisting solely of carbon, hydrogen and a single nitrogen atom, and containing at least one aliphatic hydrocarbon group substituted on the meso carbon.

15. A rubber composition comprising rubber and at least 0.2% of an acridane consisting solely of carbon, hydrogen and a single nitrogen atom, and containing two alkyl groups substituted on the meso carbon.

16. A rubber composition comprising rubber and at least 0.2% of meso, meso dimethyl acridane.

17. A rubber composition comprising rubber and an acridane consisting solely of carbon, hydrogen and a single nitrogen atom, and in which at least one of the carbon rings is at least partially saturated.

18. A rubber composition comprising rubber and an acridane consisting solely of carbon, hydrogen and a single nitrogen atom, and in which at least one of the carbon rings is at least partially saturated and which contains at least one hydrocarbon substituent on the meso carbon atom.

19. A rubber composition comprising rubber and an acridane consisting solely of carbon, hydrogen and a single nitrogen atom, and in which at least one of the carbon rings is at least partially saturated and which contains two alkyl substituents on the meso carbon atom.

20. A rubber composition comprising rubber and meso, meso dimethyl hexahydro acridane.

WALDO L. SEMON.